United States Patent [19]
Healey

[11] Patent Number: 6,082,591
[45] Date of Patent: Jul. 4, 2000

[54] GRADUATED SIGHT GLASS CONTAINER

[76] Inventor: Thomas J Healey, 4851 Gandy Blvd. West, Canal 20, Tampa, Fla. 33611

[21] Appl. No.: 09/221,678

[22] Filed: Jan. 2, 1999

[51] Int. Cl.[7] .............................. B67D 5/38; G01F 11/26; B65D 5/72
[52] U.S. Cl. .......................... 222/158; 222/572; 222/456
[58] Field of Search .................................. 222/566, 572, 222/456, 156, 154, 158; 141/372, 364, 383, 98; 220/602, 665, 365; 215/380; D9/526, 523, 528, 527

[56] References Cited

U.S. PATENT DOCUMENTS

| | | | |
|---|---|---|---|
| D. 182,683 | 4/1958 | Nowak | D58/12 |
| D. 207,030 | 2/1967 | Terrell | D58/6 |
| 1,464,395 | 9/1923 | Ross | 222/157 |

FOREIGN PATENT DOCUMENTS

| | | | |
|---|---|---|---|
| 422394 | 1/1935 | United Kingdom | 215/365 |

*Primary Examiner*—Kevin Shaver
*Assistant Examiner*—D A Bonderer
*Attorney, Agent, or Firm*—Michael I. Kroll

[57] ABSTRACT

A graduated sight glass container for retaining a substance therein and minimizing the possibility of spillage during dispensing of the substance therefrom. The graduated sight glass container includes a housing having a shape of a quadrilateral and including an indented section on a first side thereof. A spout is connected to extend from the indented section of the housing and at most up to the first side. A pool is formed within the indented section and surrounding the spout, wherein, when the container is tilted from a vertical at-rest position causing the spout to be positioned adjacent an opening through which the substance contained within the container is to flow, the pool is caused to at least partially receive an edge of the opening. Extending along a second side of the housing is a first graduated scale and a second graduated scale extends along a base of the housing for measuring an amount of the substance within said container and an amount of the substance dispensed from the container during dispensing. The first and second graduated scales are both made of a clear material allowing a user to view the substance within the container therethrough and include indicia printed therealong indicative of a volume of said container at predetermined positions.

1 Claim, 7 Drawing Sheets

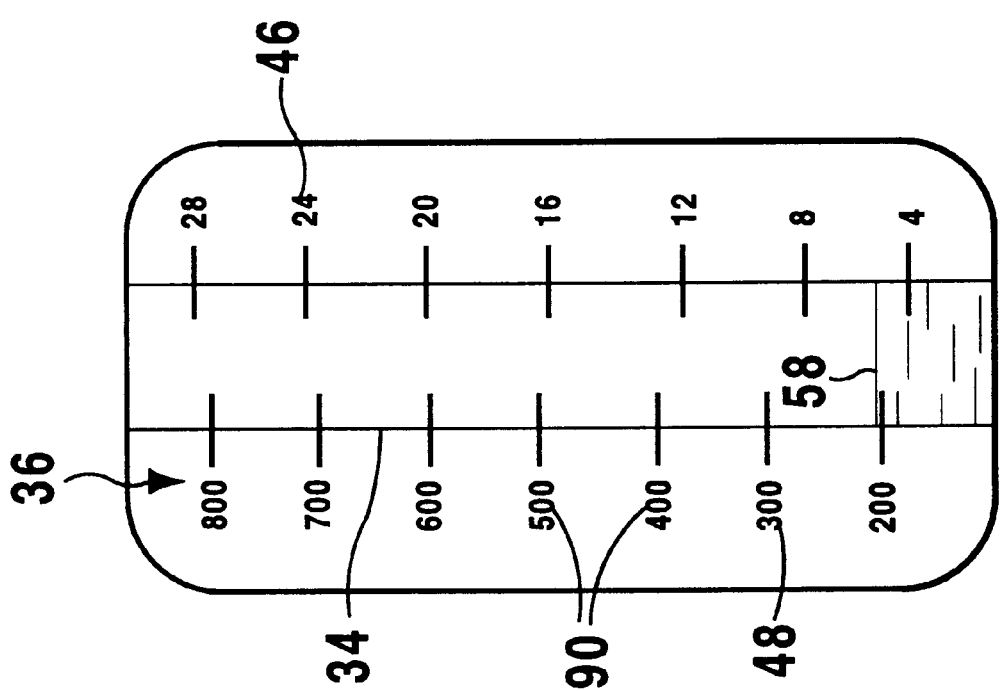
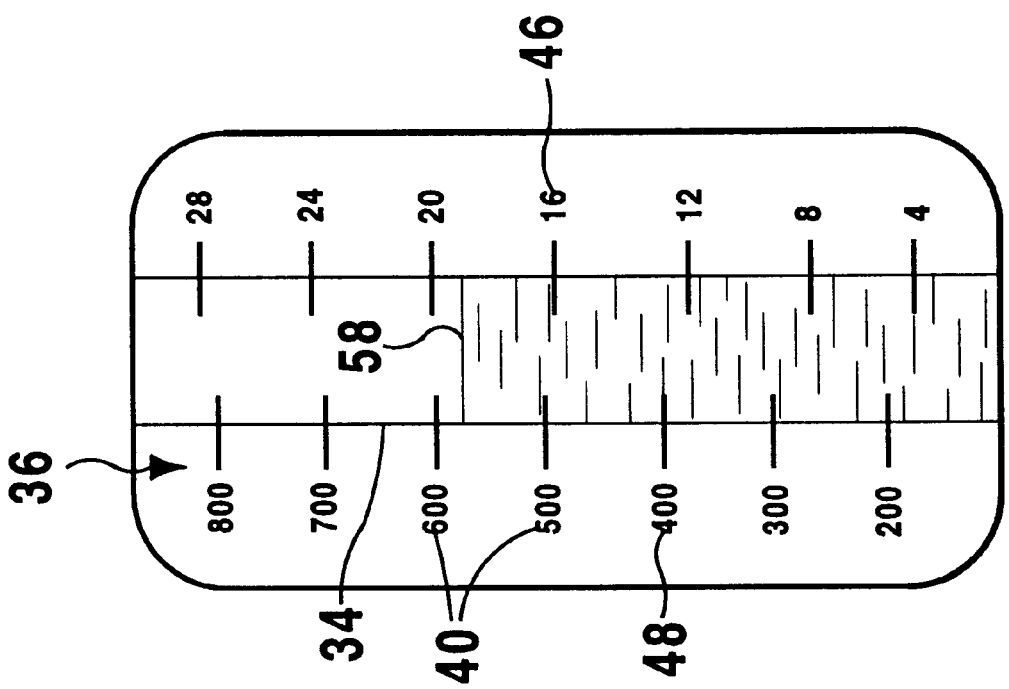

GRADUATED SIGHT GLASS CONTAINER

BACKGROUND OF THE INVENTION

1. Field of the Invention

The present invention relates generally to containers and, more specifically, to a one piece container having a recessed corner pour spout contained within a conventional rectangular shape. The pour spout is formed by indenting a side of the container at an edge thereof and extending the side situated below the spout to an edge of the spout, thereby forming a generally rectangular shape and increasing the stackability as well as allowing the pour spout to extend closer to the opening receiving the fluid. The container also includes a graduated scale extending longitudinally down a side of the container opposite the pour spout and across the bottom of the container thereby enabling an accurate measurement of the remaining fluid within the container and providing a visual aid as to whether the container is completely empty prior to disposal.

2. Description of the Prior Art

Numerous types of containers including various pour spouts have been provided in the prior art. For example, U.S. Pat. Nos. 3,318,505; 3,493,146; 5,065,914; 5,406,994 and 5,613,574 all are illustrative of such prior art. While these units may be suitable for the particular purpose to which they address, they would not be as suitable for the purposes of the present invention as heretofore described.

This invention relates to plastic dispensing containers, and consists more particularly in new and useful improvements in a plastic container of the type which is thermoformed from two hot sheets of plastic by a known method which includes the heat sealing of two container halves, providing a seam which joins the bounding edges of the respective halves, and wherein a dispensing tube is integrally formed on one side of the container in the plane of the fused seam.

A liquid container of rigid or semi-rigid thermoplastic resin material of substantially cubical form with a vertical front wall and a horizontal bottom wall connected by an angular transversely extending wall with a neck formed thereon through which the container is preferably filled and through which liquid may be dispensed from the container. On the neck is mounted a dispensing valve assembly which includes a valve sleeve slidably mounted in a positioning sleeve, with the latter sleeve slidably mounted within the neck and movable outwardly to move the outer portion of the valve sleeve from a protected position, inwardly of the front vertical wall, to an extended dispensing position outwardly beyond said wall, means being provided for holding the positioning sleeve in its outer extended position. In addition, the valve sleeve is provided with a shroud arrangement for normally enclosing the outer end of the positioning sleeve and a tamper-proof seal arrangement connected between the valve sleeve and the neck for showing whether either the valve sleeve or the positioning sleeve has been moved from its original position. Also, vent means is provided for allowing entrance of air into the container for the dispensing operation.

A thermoplastic container molded in a single piece includes a storing body and a pouring tube. A pivoting means or hinge for the tube is obtained by the formation of two recessed pyramids on two lateral walls such that the pivoting of the tube takes place by inner surfaces, which are incorporated in the break in the articulation, folding up flat.

A pour spout for conducting a liquid, such as fuel, from a portable ventless container to a tank which includes a mechanism for enabling a user to readily determine when the tank is full and when fluid flow from the portable container into the tank has stopped. The mechanism includes a window in a wall of the container and a deflector connected to the pour spout which extends into the interior of the container for directing air bubbles entering the container through the pour spout toward the window. The window permits a user to visually determine when the displaced air bubbles stop flowing which is an indication that the tank is full and flow of the liquid has stopped. The window may be in the form of a translucent thin wall section, a transparent pane mounted in the wall, or the container itself may be translucent throughout so that the displaced air bubbles may be seen when directed to a location adjacent a wall. The container also includes a carrying handle and a pouring handle located in such a manner that the center of gravity of the container is located closely adjacent to a vertical line passing through the point of support of a user's hand on the pouring handle during a pouring operation.

SUMMARY OF THE PRESENT INVENTION

The present invention relates generally to containers and, more specifically, to a one piece container having a recessed corner pour spout contained within a conventional rectangular shape. The pour spout is formed by indenting a side of the container at an edge thereof and extending the side situated below the spout to an edge of the spout, thereby forming a generally rectangular shape and increasing the stackability as well as allowing the pour spout to extend closer to the opening receiving the fluid. The container also includes a graduated scale extending longitudinally down a side of the container opposite the pour spout and across the bottom of the container thereby enabling an accurate measurement of the remaining fluid within the container and providing a visual aid as to whether the container is completely empty prior to disposal.

A primary object of the present invention is to provide a graduated sight glass container that will overcome the shortcomings of prior art devices.

Another object of the present invention is to provide a graduated sight glass container including a pour spout extending from a side thereof allowing the pour spout to be positioned close to and directly over a fluid receiving opening prior to dispensing the contents of the container through the opening.

A further object of the present invention is to provide a graduated sight glass container which is able to prevent spillage of the contents of the container during dispensing.

A yet further object of the present invention is to provide a graduated sight glass container including a graduated scale extending along a side and base of the container and wherein at least the graduated scale is made of a clear material allowing the user to view the contents therein and determine when the container is empty.

A still further object of the present invention is to provide a graduated sight glass container wherein the graduated scale allows the user to accurately measure an amount to be dispensed from the container as well as an amount of substance remaining in the container.

A further object of the present invention is to provide a graduated sight glass container wherein the translucent graduated scale extends along the base of the container thereby providing the user with an accurate measurement as to the amount of substance remaining in the container during dispensing of the substance.

A still further object of the present invention is to provide a graduated sight glass container having a rectangular shape without any protrusions extending therefrom to thereby increasing the stackability of the container.

Another object of the present invention is to provide a graduated sight glass container that is simple and easy to use.

A still further object of the present invention is to provide a graduated sight glass container that is economical in cost to manufacture.

Additional objects of the present invention will appear as the description proceeds.

A graduated sight glass container for retaining a substance therein and minimizing the possibility of spillage during dispensing of the substance therefrom is disclosed by the present invention. The graduated sight glass container includes a housing having a shape of a quadrilateral and including an indented section on a first side thereof. A spout is connected to extend from the indented section of the housing and at most up to the first side. A pool is formed within the indented section and surrounding the spout, wherein, when the container is tilted from a vertical at-rest position and the spout is positioned adjacent an opening through which the substance contained within the container is to flow, the pool is caused to at least partially receive an edge of the opening. Extending along a second side of the housing is a first graduated scale and a second graduated scale extends along a base of the housing for measuring an amount of the substance within said container and an amount of the substance dispensed from the container during dispensing. The first and second graduated scales are both made of a clear material allowing a user to view the substance within the container therethrough and include indicia printed therealong indicative of a volume of said container at predetermined positions.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

Figure 1:
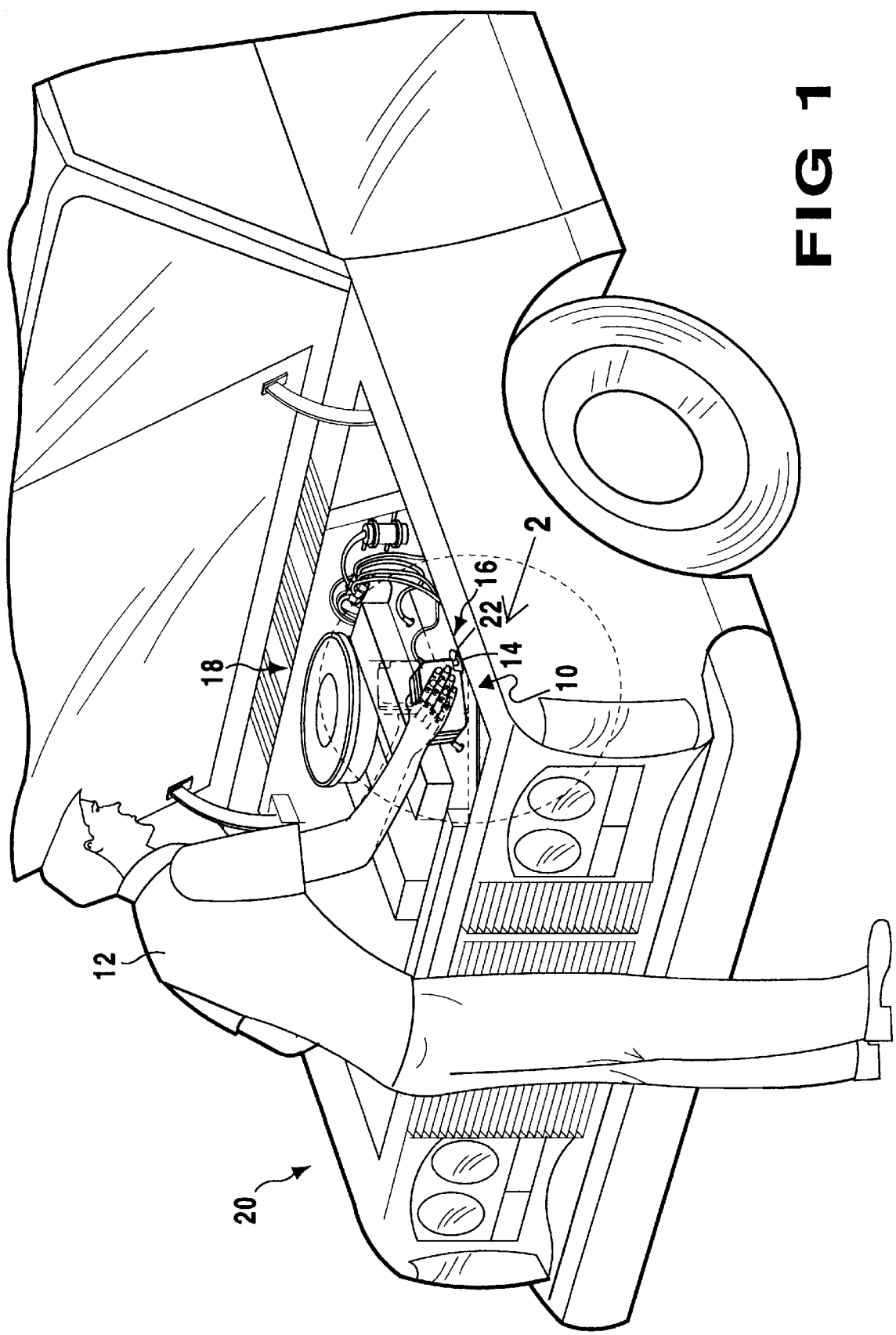
FIG. 1 is a side perspective view of a person using the graduated sight glass container of the present invention to dispense oil into the engine of a vehicle.

FIG. 8 is a bottom view of the graduated sight glass container of the present invention, the container positioned to extend horizontally to illustrate the graduated scale positioned on the bottom thereof and being filled to approximately two-thirds capacity with a liquid; and FIG. 9 is a bottom view of the graduated sight glass container of the present invention after a significant amount of the contents therein have been dispensed, the container positioned to extend horizontally to illustrate the graduated scale positioned on the bottom thereof.

DESCRIPTION OF THE REFERENCED NUMERALS

Turning now descriptively to the drawings, in which similar reference characters denote similar elements throughout the several views, the Figures illustrate the graduated sight glass container of the present invention. With regard to the reference numerals used, the following numbering is used throughout the various drawing figures.

10 graduated sight glass container of the present invention
12 user
14 fluid receiving opening of oil tank
16 oil tank of vehicle
18 engine of vehicle
20 vehicle
22 spout of graduated sight glass container
24 label identifying contents of graduated sight glass container
26 indented section of graduated sight glass container
28 first side of graduated sight glass container
30 graduated scale extending down second side of graduated sight glass container
32 second side of graduated sight glass container
34 graduated scale extending down base of graduated sight glass container
36 base of graduated sight glass container
38 indicia on graduated scale extending down second side
40 indicia on graduated scale extending along base
42 indicia indicating volume in ounces graduated scale extending down second side
44 indicia indicating volume in ml. graduated scale extending down second side
46 indicia indicating volume in ounces graduated scale extending along base
48 indicia indicating volume in ml. graduated scale extending along base
50 cover for spout
52 pool formed around spout
54 base side of the indented section
56 liquid within graduated sight glass container measured when standing vertically
58 liquid within graduated sight glass container measured when horizontal

DETAILED DESCRIPTION OF THE PREFERRED EMBODIMENT

Turning now descriptively to the drawings, in which similar reference characters denote similar elements throughout the several views, FIGS. 1 through 9 illustrate the graduated sight glass container of the present invention indicated generally by the numeral 10.

The graduated sight glass container 10 of the present invention is shown in FIG. 1. In this figure, the graduated sight glass container 10 is being used by a person 12 to deposit oil into an opening 14 for the oil tank 16 in an engine 18 of a vehicle 20. The graduated sight glass container 10 includes a spout 22 which is able to be positioned close to and directly over the opening 14 through which the contents of the graduated sight glass container 10 will be deposited prior to pouring.

Figure 2:
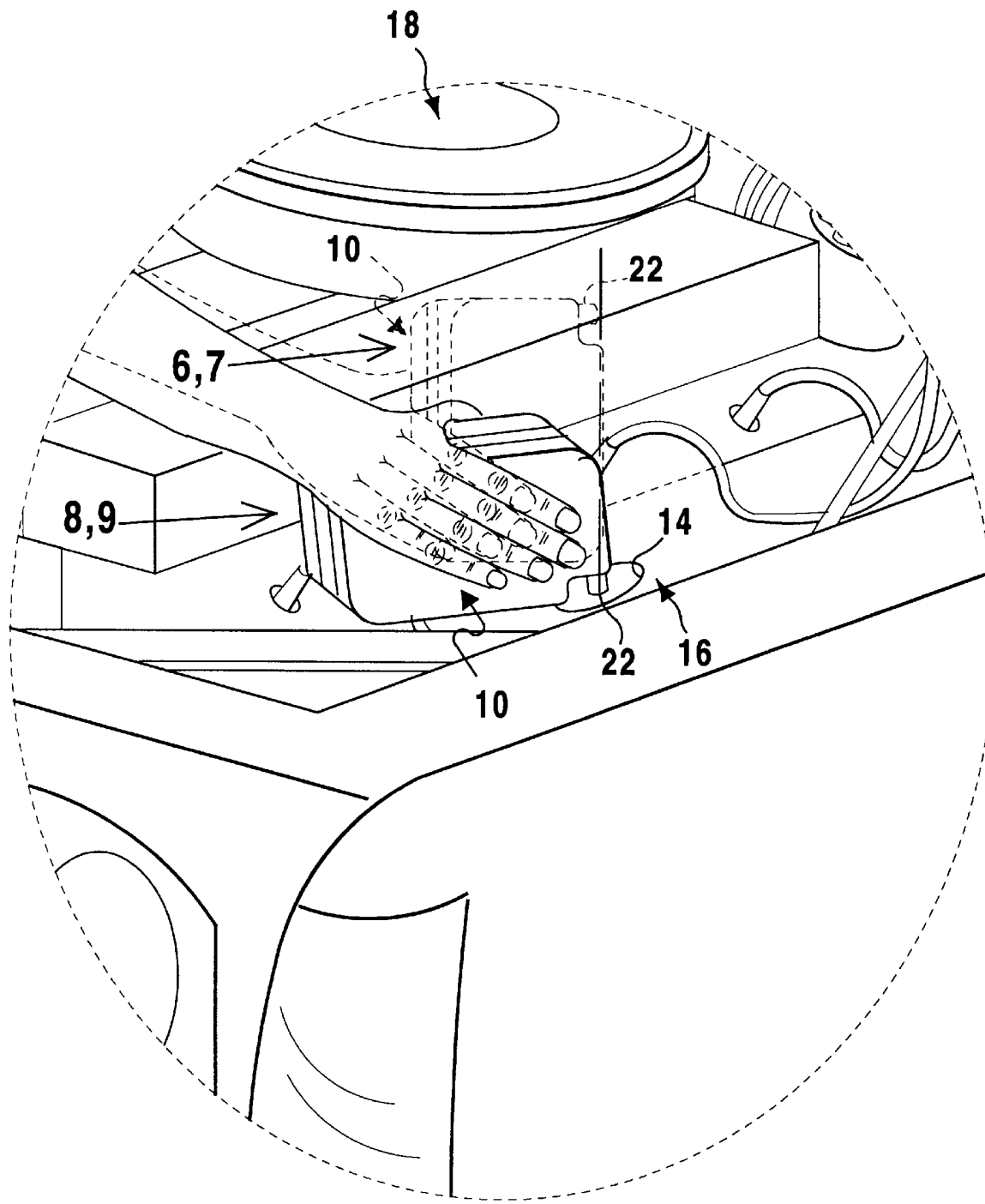
FIG. 2 is an enlarged top perspective view of the graduated sight glass container of the present invention dispensing oil into the engine of the vehicle taken from within the circle labeled 2 of FIG. 1.

An enlarged view of the graduated sight glass container 10 is illustrated in FIG. 2. This view illustrates the user 12 holding the graduated sight glass container 10 in one hand 24 and placing the spout 22 at the opening through which the contents of the graduated sight glass container 10 will be poured. The graduated sight glass container 10 is shown in its upright position in dashed lines. The spout 22 of the graduated sight glass container 10 is able to fit into the opening 14 and thus allow dispensing of the contents of the graduated sight glass container 10 with a minimal amount of spillage.

Figure 3:
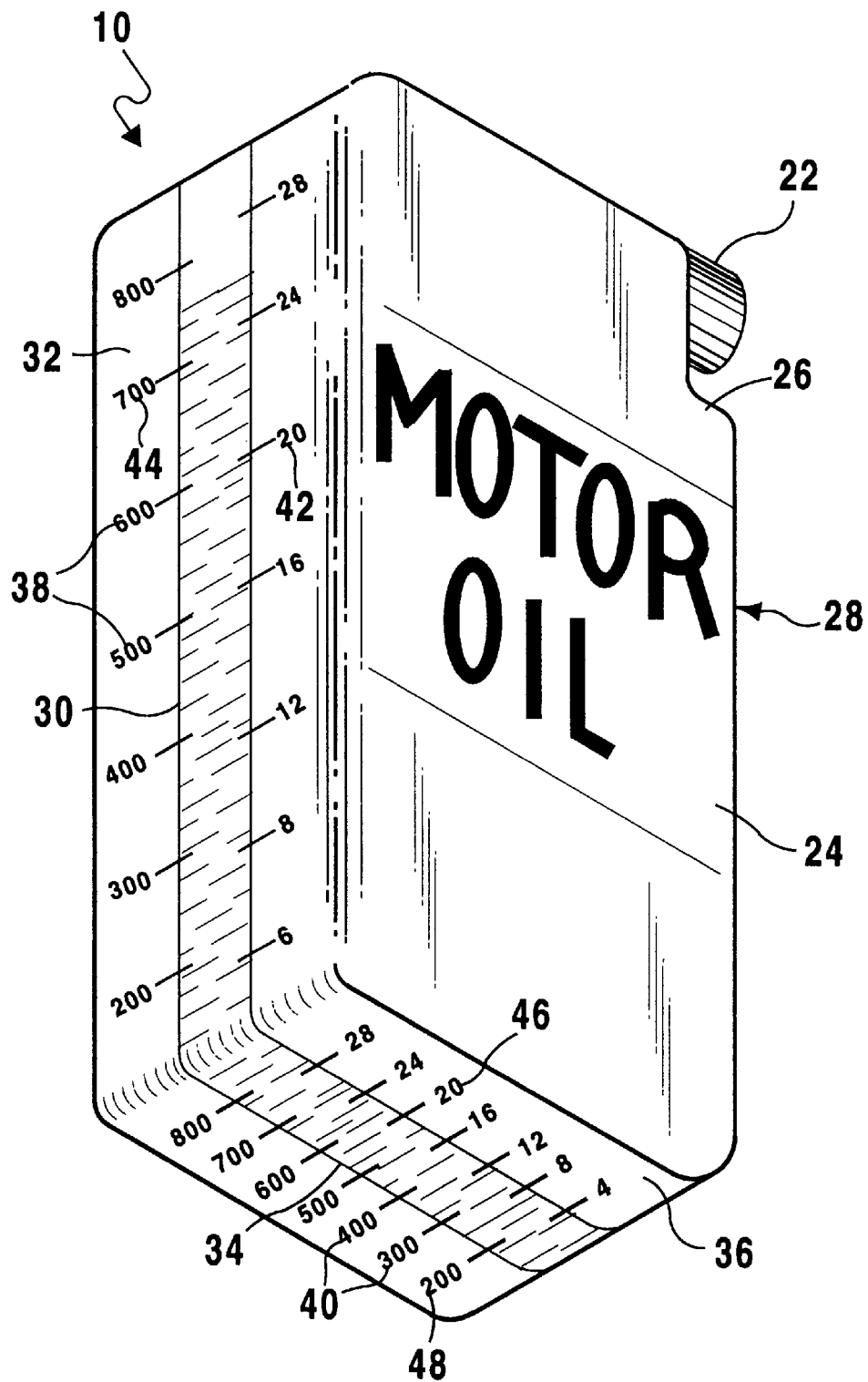
FIG. 3 is a bottom perspective view of the graduated sight glass container of the present invention.

An exploded bottom perspective view of the graduated sight glass container 10 is illustrated in FIG. 3. This figure illustrates use of the graduated sight glass container 10 for retaining motor oil therein as is indicated by the label 24. The spout 22 is positioned to extend from an indented section 26 of a first side 28 of the container 10. The spout 22 has a length not greater than a length of the indented section 26 and therefore does not extend past the first side 28.

As can be seen from FIG. 3, the graduated sight glass container 10 is preferably in the shape of a rectangle and includes a first graduated scale 30 extending along a second side 32 thereof. At least a portion of the second side 32 is preferably made of a translucent material allowing the user to view the contents of the graduated sight glass container 10 and determine the amount of substance contained therein using the first graduated scale 30. The first graduated scale 30 includes indicia 38 printed therealong, the indicia being indicative of the volume of the container 10 at predetermined heights along the length of the second side 32. The indicia 38 allows the user to determine the amount of substance within the graduated sight glass container 10 when in a vertical upright position. The indicia 38 is provided to indicate the volume of the container in both ounces 42 and milliliters 44. The measurement of the volume using ounces and milliliters is for purposes of example only. The indicia may use any other unit of measurement such as cubic centimeters, cups, pints, quarts, gallons, etc. Measurement of the volume of the contents when the graduated sight glass container 10 is in a vertical position will be described in greater detail hereinafter with specific reference to FIGS. 6 and 7.

A second graduated scale 34 extends along a base side 36 thereof. At least a portion of the base side 36 is preferably made of a translucent material allowing the user to view the contents of the graduated sight glass container 10 and determine the amount contained therein using the second graduated scale 34. The second graduated scale 34 includes indicia 40 printed therealong, the indicia being indicative of the volume of the container at predetermined heights along the length of the base side 36. The indicia 40 allows the user to determine the amount of substance within the graduated sight glass container 10 when in a horizontal position, e.g. when the contents are being dispensed. The graduated scale 34 also allows the user to measure an amount of substance being dispensed. The indicia 40 is provided to indicate the volume of the container in both ounces 46 and milliliters 48. The measurement of the volume using ounces and milliliters is for purposes of example only. The indicia may use any other unit of measurement such as cubic centimeters, cups, pints, quarts, gallons, etc. Measurement of the volume of the contents when the graduated sight glass container 10 is in a horizontal position will be described in greater detail hereinafter with specific reference to FIGS. 8 and 9.

Figure 4:
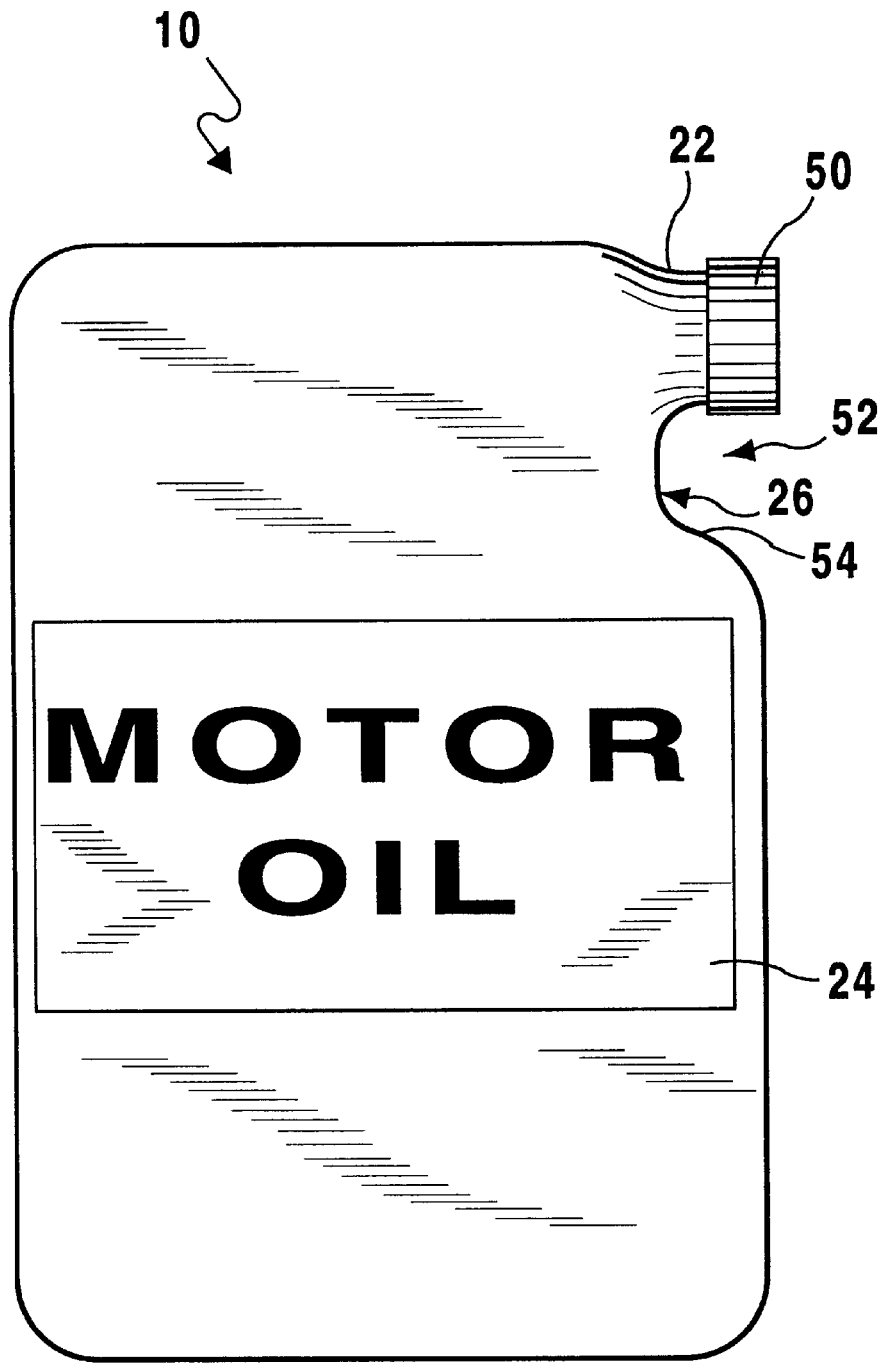
FIG. 4 is a side view of the graduated sight glass container of the present invention.

A side view of the graduated sight glass container 10 is shown in FIG. 4. From this figure it is seen that the graduated sight glass container 10 is preferably rectangular in shape and includes an indented section 26 on the first side 28 thereof. Extending from the indented section 26 and having a length substantially equal to that of the indented section 26 is the spout 22. The spout 22 thus extends no further than the first side 28. The spout 22 further includes a cover 50 releasably engaged therewith for sealing the graduated sight glass container 10 when not in use. The cover 50 may be releasably connected to the spout 22 by any known means such as a threaded engagement between a thread spiraling around an inner side of the cover 50 and a thread spiraling around an outer side of the spout 22, a stopper arrangement wherein the cover 50 has a circumference substantially equal to the circumference of the spout 22 and fits within the spout 22, etc.

Figure 5:
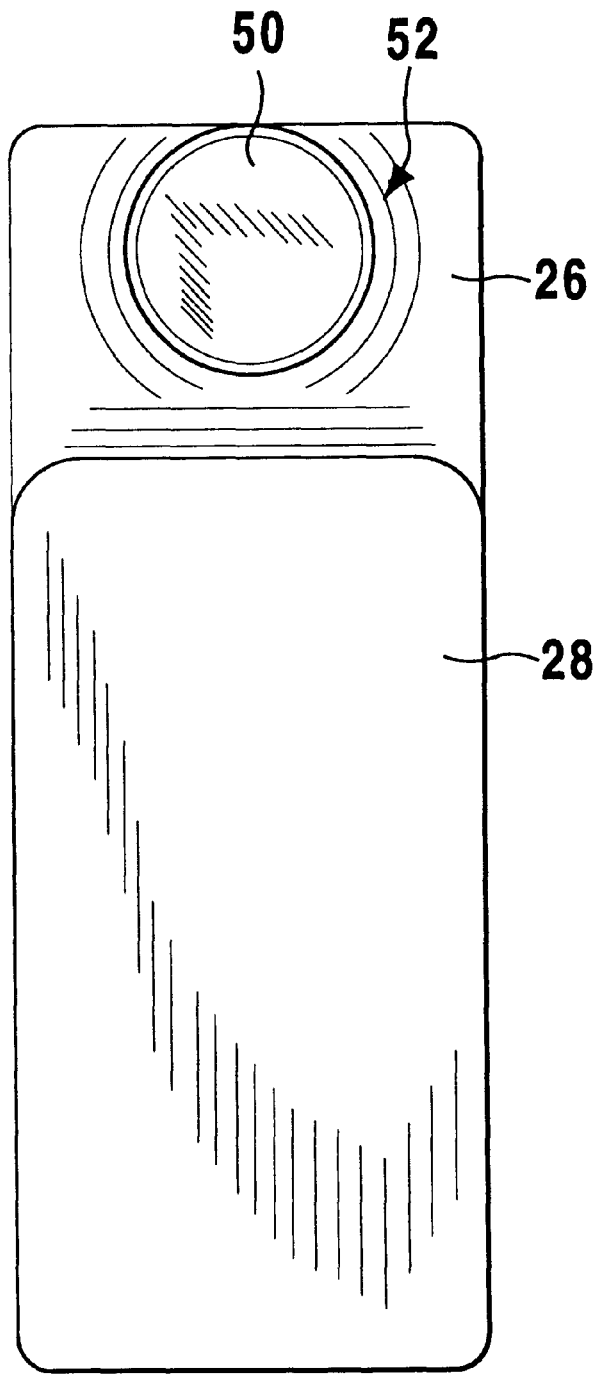
FIG. 5 is a front side view of the graduated sight glass container of the present invention.

Surrounding the spout 22 is a pool 52 as can be seen in FIG. 5. The spout 22 is shaped to fit within a desired opening when tilted for dispensing the contents therein such that the rim of the opening is received within the pool 52. The placement of the spout 22 in the opening during dispensing eliminates the possibility of spilling the contents. The graduated sight glass container 10 may also include a label 24 for identifying the contents.

FIG. 5 illustrates the graduated sight glass container 10 of the present invention looking at the first side 28. This view shows the spout 22 extending from the indented section 26 and the cover 50 positioned to selectively seal the spout 22 preventing the contents from being dispensed therethrough. Surrounding the spout is the pool 52, providing a space between the spout 22 and a base side 54 of the indented section 26. This allows the spout 22 to extend into the opening when dispensing the contents of the graduated sight glass container 10.

Figure 7:
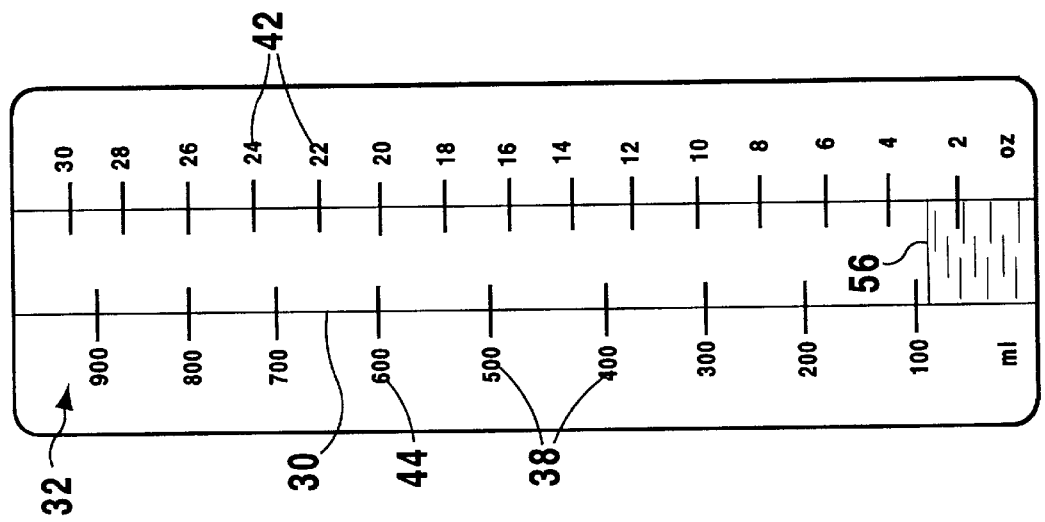
FIG. 7 is back side view of the graduated sight glass container of the present invention after a significant amount of the contents therein have been dispensed.
Figure 6:
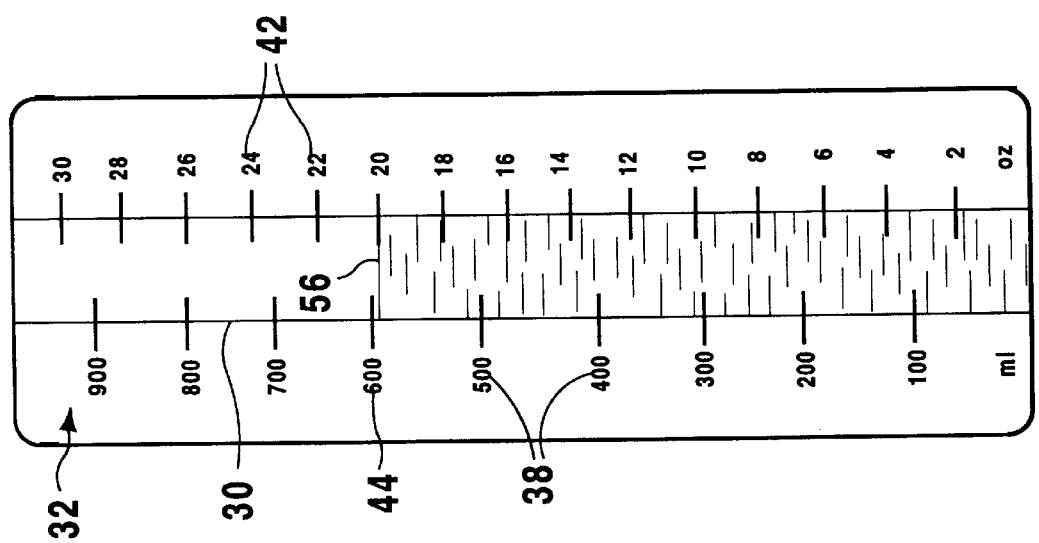
FIG. 6 is back side view of the graduated sight glass container of the present invention, the container filled to approximately two-thirds capacity with a liquid.

FIGS. 6 and 7 illustrate use of the first graduated scale 30 for measuring the volume of substance filling the graduated sight glass container 10. FIG. 6 illustrates a substance 56 within the graduated sight glass container 10 filling approximately two thirds of the graduated sight glass container 10. The amount of the substance 56 within the container measures up to the line of the indicia 38 indicating 20 ounces and slightly less than 600 milliliters. When an amount of the substance 56 is dispensed from the graduated sight glass container 10, the level of the substance will decrease as illustrated in FIG. 7. This figure indicates that an amount of the substance 56 has been dispensed from the graduated sight glass container 10 until an amount approximately equal to 3 ounces and slightly less than 100 milliliters remains within the graduated sight glass container 10. Thus, after dispensing a desired amount of substance therefrom and placing the graduated sight glass container 10 in a vertical position, a user is able to determine when the graduated sight glass container 10 is empty and also determine how much of the contents has been dispensed.

FIGS. 8 and 9 illustrate the second graduated scale 34 extending along the base 36 of the graduated sight glass container 10. When viewing the second graduated scale 34, the graduated sight glass container 10 is in a horizontal position for dispensing the contents therein. FIG. 8 illustrates a substance 58 within the graduated sight glass container 10 filling approximately two thirds of the graduated sight glass container 10. The amount of the substance 58 within the container 10 measures up to the line of the indicia 40 indicating slightly less than 20 ounces and slightly less than 600 milliliters. When an amount of the substance 58 is dispensed from the graduated sight glass container 10, the level of the substance will decrease as illustrated in FIG. 9. This figure indicates that an amount of the substance 58 has been dispensed from the graduated sight glass container 10 until an amount approximately equal to 5 ounces and slightly more than 200 milliliters remains within the graduated sight glass container 10. When using the second graduated scale 34 an amount of the contents can be measured during dispensing to provide an accurate measurement of the amount which has been dispensed. The user may thus is able to dispense a desired amount, ceasing the dispensing of the contents when the desired measurement is reached.

The operation of the graduated sight glass container 10 will now be described with reference to the figures. In operation, the graduated sight glass container 10 is filled with a desired substance and the cover 50 is positioned to releasably seal the substance therein. When it is desired to dispense the substance from within the container 10, the cover 50 is removed.

Prior to dispensing, the user views the first graduated scale 30 to determine how much of the substance is contained within the container 10. The user then calculates how much of the substance is desired to be dispensed and determines the indicia reading on the graduated scale which corresponds to the calculated amount. The container 10 is then grasped by the user and the spout 22 is positioned over the opening 14 through which the contents are to be dispensed. As the container 10 is tilted into a horizontal position, the spout 22 is caused to extend into the opening 14. The contents are caused to be dispensed from the container 10 as the container 10 is tilted further. As the container 10 is tilted, the second graduated scale 34 enters the line of sight of the user. The user may now measure the amount being dispensed by observing the decreasing level of substance within the container on the second graduated scale 34. When the level of substance observed matches the determined level, the user will tilt the container 10 back to the vertical position and thereby cease dispensing of the substance. The user is also able to determine when the container 10 is empty and can either be refilled or disposed of by viewing the first graduated scale 30. The cover 50 will now be placed to seal the spout 22 closed until the next desired use.

From the above description it can be seen that the graduated sight glass container of the present invention is able to overcome the shortcomings of prior art devices by providing a graduated sight glass container including a pour spout extending from a side thereof allowing the pour spout to be positioned close to a fluid receiving opening prior to pouring the contents of the container and thereby prevent spillage of the contents of the container. The graduated sight glass container may be made of a clear material allowing the user to view the contents therein and determine when the container is empty and includes a translucent graduated scale positioned on a side of the container allowing the user to accurately measure an amount of substance to be dispensed from and an amount of substance remaining in the container. The translucent graduated scale extends along the base of the container thereby providing the user with an accurate measurement as to the amount of substance remaining in the container during dispensing of the substance. The graduated sight glass container also has a rectangular shape without any protrusions thereby increasing the stackability of the container. Furthermore, the graduated sight glass container of the present invention is simple and easy to use and economical in cost to manufacture.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A graduated sight glass container for retaining a substance therein and minimizing the possibility of spillage during dispensing of the substance therefrom, said graduated sight glass container comprising:

a) a rectangular housing consisting of thermoplastic material having a shape of a quadrilateral and including a right angled indented section on a flat, first side at a corner of a flat top thereof with a flat face of said indented section parallel to said first side;

b) a spout connected to extend from said face and at most up to said first side; and c) said spout being substantially centrally located on said face to form a pool within said indented section and surrounding said spout, wherein, when said container is tilted from a vertical at-rest position causing said spout to be positioned adjacent an opening through which the substance contained within said container is to flow, said pool is caused to at least partially receive an edge of the opening;

d) said housing further consisting of a flat, second side opposite and parallel to said first side with a first graduated scale with parallel, spaced markings extending along a length of said second side for measuring an amount of the substance within said container, said first graduated scale being made of a clear material allowing a user to view the substance within the container, said second side extending up to the top of said housing with said graduate scale uniformly spaced up to a point opposite a bottom of said indented section;

e) said housing still further consisting of a flat base opposite the top of said housing having a second graduated scale with parallel, equidistant spaced markings extending along a length of said base for measuring an amount of the substance dispensed from within said container when said container is pivoted from its vertical at-rest position to a horizontal position, said second graduated scale being made of a clear material allowing a user to view the substance within said container; and f) third and fourth flat sides at right angles to said first and second sides extending from said base to the top of said housing.

* * * * *